United States Patent [19]

Stadnick et al.

[11] Patent Number: 4,683,178
[45] Date of Patent: Jul. 28, 1987

[54] PROCESS FOR PREVENTING ELECTRICAL STORAGE CELL CAPACITY LOSS

[75] Inventors: Steven J. Stadnick, Redondo Beach; Howard H. Rogers, Torrance, both of Calif.

[73] Assignee: Hughes Aircraft Company, Los Angeles, Calif.

[21] Appl. No.: 827,023

[22] Filed: Feb. 7, 1986

[51] Int. Cl.$^4$ .............................. H01M 12/06
[52] U.S. Cl. ..................... 429/101; 429/27; 429/60; 429/48
[58] Field of Search ............. 429/101, 27, 60, 48; 320/2

[56] References Cited

U.S. PATENT DOCUMENTS

| | | | |
|---|---|---|---|
| 3,174,878 | 3/1965 | Peters | 429/60 |
| 3,278,334 | 10/1966 | Urry | 429/60 X |
| 3,867,199 | 2/1975 | Dunlop et al. | 429/101 |
| 3,959,018 | 5/1976 | Dunlop et al. | 429/40 |
| 3,990,910 | 11/1976 | Griner et al. | 429/59 |
| 4,174,565 | 11/1979 | Kordesch | 429/101 X |
| 4,275,127 | 6/1981 | Ritterman et al. | 429/60 X |

Primary Examiner—Anthony Skapars
Attorney, Agent, or Firm—S. M. Mitchell; M. J. Meltzer; A. W. Karambelas

[57] ABSTRACT

A process for preventing electrical capacity loss during storage of a pressurized nickel-hydrogen electrical storage cell. An electrical precharge is applied to the positive electrode of the cell, so that discharge of the cell is negative electrode limited. In one approach, the cell is charged, while sealed, to a state of charge corresponding to a first gas pressure, and then the hydrogen pressure is reduced to a lower value, preferably about atmospheric. In another approach, a current is passed through the cell while the cell is unsealed and maintained at atmospheric gas pressure, until the cell reaches the desired state of charge.

10 Claims, 2 Drawing Figures

U.S. Patent
Jul. 28, 1987
4,683,178
FIG. 1
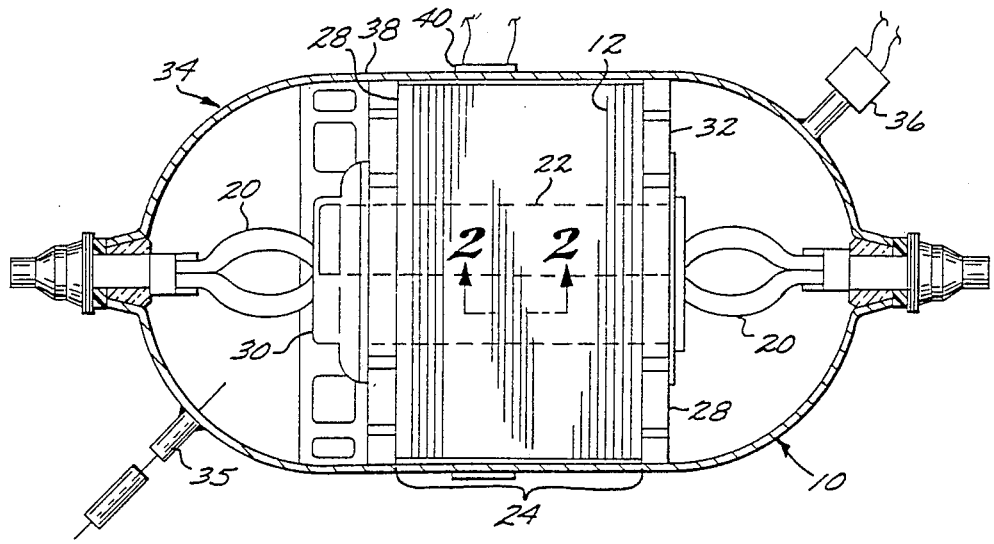
FIG. 3
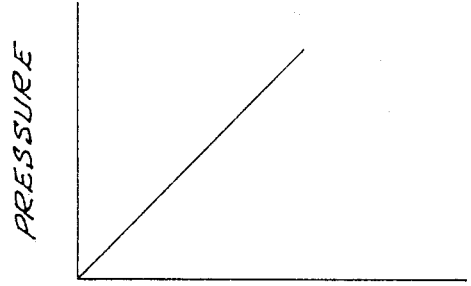
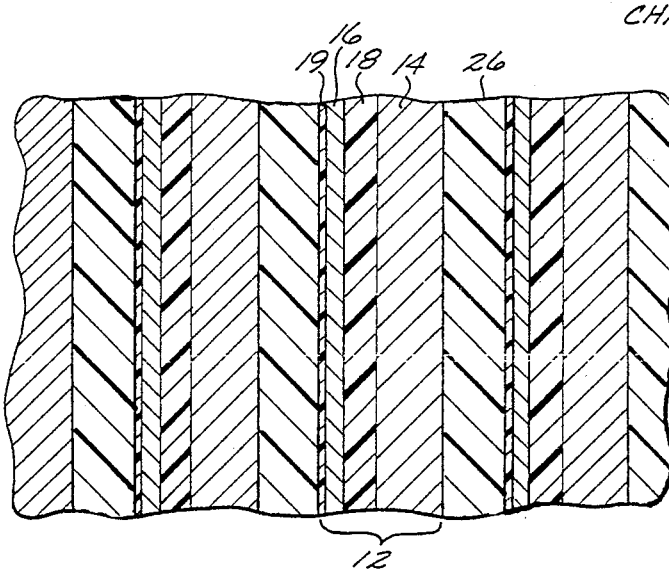
FIG. 2

PROCESS FOR PREVENTING ELECTRICAL STORAGE CELL CAPACITY LOSS

BACKGROUND OF THE INVENTION

This invention relates generally to pressurized gas-metal cells such as nickel-hydrogen cells and, more particularly, to a process for reducing the open-circuit capacity loss during storage of such cells.

Rechargeable cells or batteries are electrochemical devices for storing and retaining an electrical charge and later delivering that charge as a useful current. A familiar example of the rechargeable cell is the lead-acid cell used in automobiles. Another type of cell having a greater storage capacity per unit weight is the pressurized gas-metal cell, an important type of which is the nickel-hydrogen cell used in spacecraft applications. A nickel-hydrogen cell used in a satellite is periodically charged by electrical current produced by solar panels on the spacecraft, and then later discharged to supply electrical power, as when the spacecraft is in shadow or peak electrical power is demanded.

The primary requirements of cells to be used in spacecraft are high energy storage capacity per unit weight of cell, reliability, and the ability to be recycled through many cycles of charging and discharging. A newly assembled nickel-hydrogen cell has a high energy storage capacity as measured in ampere-hours. However, it is observed by many users that, after the cell has been stored in an open circuit or short circuit, discharged condition for a period of time, the maximum storage capacity upon attempting to fully charge the cell is reduced, as compared with the value that is attainable with a newly assembled cell. The loss of full-charge energy capacity that is experienced while the cell is stored gradually increases with increasing storage time, and can be as great as 20% of capacity after a storage time of one month. Once the cell capacity is lost in this manner, it is difficult or impossible to restore the cell fully to its initial high level of capacity.

This reduction of the electrical capacity of the cell during open-circuit storage presents a serious problem for the manufacturer and the user of the cell. It is usually most efficient to manufacture and assemble the cell at a site different from that of its installation into the spacecraft. The cell must therefore be transported after assembly. Moreover, installation of the cell into the spacecraft may occur several days or weeks prior to the actual launching of the spacecraft and charging of the cell by the solar panels, because of the need to check the spacecraft with the cells in place and also because of possible delays in the launching of the spacecraft. The time between the final assembly of the cell and the actual first operation of the cell in space is often as much as one year, with the result that the electrical storage capacity of the nickel-hydrogen cell may be substantially reduced. Moreover, it is usually desirable to manufacture a number of cells at one time, so that the actual storage time may be even longer, with a corresponding greater decrease in the capacity of the cell when it is finally placed into service.

It is not practical to delay the final assembly and activation of the cells until just before the launch of the spacecraft, because this procedure would be inefficient, cumbersome, and would significantly interfere with the smooth scheduling of the launch procedure of the spacecraft. It is also not practical to ship the cells partially charged, due to the hazards arising from the presence of pressurized hydrogen. For these reasons, the various approaches to reducing or eliminating the reduction in cell capacity during cell storage either have not been successful or are excessively costly.

A need therefore exists for an approach for reducing or eliminating completely the loss in electrical charge capacity of nickel-hydrogen cells. The approach should be fully capatible with existing cell components and handling procedures, and should not necessitate significant modifications to spacecraft launching procedures. The approach should not require specialized, complex or expensive equipment that would be used in conjunction with the launching of the spacecraft, since such additional equipment would complicate the launch procedures and possibly create difficulties because of the support equipment. The approach should also not significantly increase the weight of the cell or decrease its charge capacity, charging and discharging characteristics, or ability to be charged and discharged thousands of times during the operating life of the spacecraft. The present invention fulfills this need, and further provides related advantages.

SUMMARY OF THE INVENTION

The present invention resides in a method and apparatus for reducing and eliminating the capacity loss during storage of nickel-hydrogen cells. The process does not require any modification either to the cell design, or to the assembly procedure, except in the final assembly and packaging stage. No specialized apparatus is required, either at the factory or at the spacecraft launch site. By using the approach of the invention, the cell may be assembled many months prior to the launch of the spacecraft and first operational use of the cell, without substantial loss in the capacity of the cell resulting from the storage.

In accordance with the invention, a process for reducing the capacity loss during storage of a pressurized nickel-hydrogen cell, comprises precharging the cell prior to storage so that discharge of the cell is negative electrode limited, whereby an electrical charge remains on the nickel positive electrode when the hydrogen partial pressure of the cell falls to about 0 psia. This approach is applicable to the familiar nickel-hydrogen cell, and is expected to be applicable to other cells experiencing capacity loss by a comparable mechanism.

In one approach, the step of precharging includes the steps of applying a charge to the positive electrode of the cell with the cell unvented, to an electrical charge corresponding to a first pressure, and reducing the pressure within the cell to a second pressure. The first pressure is desirably about 65 psia (pounds per square inch, absolute), and the second pressure is desirably about 15 psia, or atmospheric pressure. In another approach, the step of precharging includes the step of applying a charge to the positive electrode of the cell while the pressure within the cell is maintained at a reduced level, preferably about 15 psia. In this second approach, the charge applied to the positive electrode preferably corresponds to a sealed cell gas pressure of about 65 psia.

In another embodiment, a process for precharging a pressurized gas-metal cell comprises the steps of discharging the cell to about 0 volts at a hydrogen partial pressure of about 15 psia, electrically charging the cell while sealed to a charge corresponding to a first hydrogen pressure, and reducing the hydrogen pressure within the cell to about 15 psia. The first gas pressure is preferably about 65 psia.

In accordance with another embodiment of the invention, a process for precharging a pressurized nickel-hydrogen cell comprises passing a current through the cell while the cell is unsealed and maintained at a gas pressure of about 15 psia, until the cell reaches a charge state corresponding to a first sealed hydrogen partial pressure. The first sealed hydrogen partial sealed gas pressure is preferably about 65 psia.

Each of these approaches results in retention of a partial charge on the positive electrode when the hydrogen partial pressure is reduced to zero. Complete discharging of the positive electrode during storage therefore cannot occur. It is though that this avoidance of the complete discharging of the positive electrode is critical to reducing or avoiding the incidence of cell capacity loss during storage.

It will now be appreciated that through the use of the precharging process of the invention, a nickel-hydrogen cell can be precharged during manufacturing to reduce or avoid the loss of cell capacity during subsequent storage. The reduction or avoidance of the capacity loss allows the cell to be economically manufactured at one location, shipped to the spacecraft launch site, assembled and tested in the spacecraft, maintained in a ready condition until the spacecraft is launched, and then placed into operational service after launch of the spacecraft, all of these activities occupying a period of weeks or months, without significant loss of the electrical storage capacity of the cell. The process requires only a minimal change to the manufacturing procedures, does not increase the cost or weight of the cell, and allows its full potential to be realized. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a sectional elevational view of a flight-type nickel-hydrogen cell;

FIG. 2 is a detail of FIG. 1, taken generally on line 2—2, illustrating the plate sets; and FIG. 3 is a schematic graph of pressure as a function of electrical charge stored in a nickel-hydrogen cell during charging.

DETAILED DESCRIPTION OF THE PREFERRED EMBODIMENT

The present invention is used in conjunction with a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an anode or positive electrode 14, a cathode or negative electrode 16, and an electrolyte-containing separator 18, which physically separates the electrodes 14 and 16, and also supplies the electrolyte medium through which ionic and electron transfer occur. Charging and discharging of the electrodes 14 and 16 are accomplished through respective electrical leads 20.

Various constructions of nickel-hydrogen cells and components are disclosed in the following U.S. patents, whose disclosures are herein incorporated by reference: U.S. Pat. Nos. 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer of polytetrafluoroethylene 19. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide containing polysulfone. The electrolyte, preferably potassium hydroxide, is impregnated into the separator 18.

The individual plate sets 12 are assembled onto a central core 22 to form a stacked array 24. In forming the stacked array 24, a monofilament polypropylene screen 26 is placed between each plate set 12, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on treads on the core 22, thereby compressing a Belleville washer set 32 against the compression plate 28 to hold the stacked array 24 in place.

The stacked array 24 is sealed within a pressure vessel 34, manufactured of a material such as Inconel 718 nickel-based alloy which can withstand internal pressures on the order of 1,000 psia, without damage by hydrogen embrittlement or corrosion by the electrolyte. A gas fill tube 35 allows gas content and pressure within the pressure vessel 34 to be controlled. The pressure vessel 34 is typically constructed in the form of a cylindrical tube having domed ends. By way of illustration, the cell 10 having the pressure vessel 34 of external dimensions $3\frac{1}{2}$ inches diameter and 13 inches long can contain about 40 individual plate sets 12, with a resulting electrical storage capacity of the cell of about 50 ampere-hours. The cell 10 may be charged and discharged through thousands of cycles without apparent damage, if the charging and discharging are accomplished properly. A number of cells 10 can be combined in series or parallel to produce a battery.

Charging is accomplished by impressing a voltage through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cell and the cycle dictated by the orbit of the spacecraft.

When the gas fill tube 35 is sealed at 15 psia (atmospheric pressure) and charging commenced from a fully discharged state, the gas pressure within the cell 10 initially increases in a generally linear fashion proportional to the charge stored within the cell 10. FIG. 3 schematically illustrates this initial increase in gas pressure as a function of charge, and the correspondence of a particular charge and pressure value.

After the cell is manufactured but before it is placed into service, the cell may be stored for a period of time in an "open circuit" condition, wherein no further charging or discharging of the cell is accomplished. During that period of open circuit storage, in addition to self discharging to a fully discharged state, the cell apparently physically changes in some manner so that its maximum electrical capacity, to which it may subsequently be charged, gradually falls. For example, and as reported in greater detail in Tables I and II, a cell having an initial maximum capacity of 53.5 ampere-hours experiences a reduction of maximum capacity to 44.6 ampere-hours after 32 days of open circuit discharged storage. Similarly, a cell having an initial capacity of 28.1 ampere-hours experiences a reduction in capacity to 27.3 ampere-hours after 32 days of storage, and to 23.1 ampere-hours after 128 days of storage. The precise reason for this loss of maximum electrical capacity during storage is not known with certainty, and Applicants do not wish to be bound by any particular explanation of this phenomenon. However, it is believed that during storage with a residue hydrogen gas partial pressure within the cell, upon complete discharge there is a build-up of electrically insulating layers of uncharged nickel hydroxide on the positive electrodes 14. These insulating layers isolate the charged active areas of the positive electrode. At a later time when the cell is charged, the isolated active areas remain isolated because of the presence of the discharged insulating material, thereby reducing the useful reactive capacity of the positive electrode, and thence the cell.

In accordance with the present invention, it has been found that the gradual loss of maximum cell capacity during storage can be reduced or avoided entirely through a precharging procedure applied to the cell after assembly, but prior to the beginning of the period during which the cell is stored in an open-circuit condition. To accomplish the precharging procedure, the cell is manufactured in the usual manner as described previously, except for a final step in which the positive electrode of the cell is charged and the hydrogen precharging pressure is set to a value less than that defined by the characteristic line illustrated in FIG. 3, and preferably to 15 psia.

Discharging of a sealed nickel-hydrogen cell is ordinarily positive-electrode limited. As the cell discharges, hydrogen is consumed by reaction with the active material of the positive or nickel electrode. The reactants available at the positive electrode are exhausted before all of the hydrogen is consumed. The precharging process of the present invention results in reduced hydrogen availability near the end of discharge, with the result that complete discharge becomes negative-electrode limited. That is, upon discharging of a cell that has been precharged by the present invention, an electrical charge remains on the positive electrode when the hydrogen partial pressure of the sealed cell is reduced to about 0 psia. It is believed that this negative-electrode limitation of complete discharge is instrumental in reducing or avoiding subsequent loss of capacity during storage, by prevention of complete discharge during storage.

This precharging procedure may be accomplished in any of several different ways. In the presently most preferred approach, the cell 10 is discharged to zero volts and the internal pressure is equilibrated to a partial pressure of 1 atmosphere of hydrogen, or 15 psia. The fill tube 35 is then sealed, and the positive electrode of the cell is charged to a positive charge level, preferably a charge level corresponding to a pressure of about 65 psia. After the cell is charged with the fill tube 35 sealed, the fill tube 35 is then unsealed by venting the tube 35, and the internal pressure within the cell is reduced to a lesser value, preferably 15 psia, with the charging leads disconnected but the cell remaining in the partially charged condition. The tube 35 is sealed, and the precharging procedure is complete. The cell may then be stored for extended periods of time substantially without loss of maximum charging capacity during the storage period.

Tables I and II illustrate the effect of various precharges upon the loss of maximum electrical capacity of several cells. The cells whose results are reported in Table I are constructed to have initial electrical capacities of about 50 ampere-hours, while those whose results are reported in Table II are constructed to have initial capacities of about 25 ampere-hours. Cells 288 (Table I), 202 and 188 (Table II) were not precharged with the apporach of the invention but instead were sealed at 15 psia. They were then stored in an open circuit condition for the indicated numbers of days. After the indicated period of storage of the cell in the open circuit condition, the maximum electrical charge capacity was determined. As may be seen, the maximum charge capacity of cell No. 288 fell from 53.5 to 44.6 ampere-hours after 32 days. Cells 202 and 188 experienced similar reductions.

TABLE I

| Cell No. | Precharge Level(1) | Init'l Capacity | Capacity to 1.0 V (Ampere-Hours) No. of Days In Open Circ.(Discharged) | | | | | |
|---|---|---|---|---|---|---|---|---|
| | | | 0 | 1 | 4 | 8 | 16 | 32 |
| 292 | 6 AH | 53.2 | 53.9 | 55.5 | 54.9 | 54.2 | 55.2 | 53.7 |
| 301 | 6 AH | 52.3 | 53.8 | 55.5 | 54.8 | 54.1 | 55.0 | 52.9 |
| 288 | 15 psia | 53.5 | 48.7 | 51.9 | 50.9 | 50.6 | 48.9 | 44.6 |
| 425 | 65 psia | 51.1 | 45.3 | 48.8 | 48.3 | 48.3 | 47.5 | 42.9 |
| 448 | 65 psia | 51.8 | 48.3 | 51.2 | 50.2 | 49.9 | 48.0 | 42.5 |

TABLE II

| Cell No. | Precharge Level(1) | Init'l Capacity | Capacity to 1.0 V (Ampere-Hours) No. of Days in Open Circuit (Discharged) | | | | | | | |
|---|---|---|---|---|---|---|---|---|---|---|
| | | | 0 | 1 | 4 | 8 | 16 | 32 | 64 | 128 |
| 169 | 5 AH | 28.5 | 29.5 | 29.2 | 29.6 | 29.2 | 29.1 | 29.1 | 27.8 | 28.4 |
| 202 | 15 psia | 25.4 | 27.6 | 28.3 | 28.6 | 28.4 | 28.0 | 26.9 | 23.3 | 21.5 |
| 188 | 15 psia | 28.1 | 28.6 | 28.6 | 28.9 | 28.8 | 28.5 | 27.3 | 23.2 | 23.1 |
| 207 | 65 psia | 24.8 | 27.4 | 28.3 | 28.8 | 28.5 | 27.8 | 26.3 | 23.2 | 19.5 |

(1) The precharge level is specified in relation to the type of precharge. For positive-electrode limited discharge (not within the invention), the hydrogen partial pressure is stated in psia. For negative-electrode limited discharge (within the scope of the invention), the precharge on the positive electrode is stated in ampere-hours (AH).

Cells 292 and 301 (Table I) and 169 (Table II) were given an initial precharge in accordance with the present invention, using the method previously described. In each case, the maximum electrical storage capacity of the cell after extended periods of storage was essentially unchanged. This unchanged maximum electrical storage capacity is highly desirable so that the cell can be stored for extended periods of time before use.

Cells 425 and 448 (Table I) and 207 (Table II) were given a positive initial hydrogen gas partial pressure, which leaves them positive-electrode limited upon discharge, a procedure not in accordance with the invention and performed for comparison. That is, the cells were pressurized above their normal hydrogen gas pressure during charging. In each case, there was a significant loss of maximum electrical storage capacity after the battery was stored for a period of days.

It is possible within the scope of the invention to reduce the gas pressure to a level below the characteristic gas pressure depicted schematically in FIG. 3, but not to atmospheric, during the precharging treatment. That is, for example, the positive electrode could be charged to a charge state corresponding to 65 psia, and then the gas pressure reduced to a value less than 65 psia but greater than atmospheric. Such an approach would create a negative-electrode limited discharge and thence provide the benefits of the invention, and would reduce the loss of capacity during storage. However, this approach is not preferred, since it would require the cell to be shipped with an internal hydrogen pressure.

Table III illustrates a further benefit obtained from the present precharging approach. Cells are observed to undergo a self discharge and stored under charge. That is, when the cell is charged and stored, a portion of the charge is lost upon storage. (This phenomenon is distinguished from the loss of capacity when stored in the discharged or open circuit state, described previously.) In these tests, cell F005 was precharged to a value of 65 psia using a hydrogen tank, a procedure not in accordance with the present invention. Cell F006 was precharged by applying a precharge corresponding to 65 psia hydrogen to the positive electrode (approximately 6 AH), and then charged and reducing the hydrogen pressure to 15 psia, a procedure in accordance with the present invention. Each cell was then allowed to stand at laboratory ambient temperature (approximately 20° C.) for 72 hours. The charge of the cell before and after the storage period was measured, and the ratio taken. As may be seen, cell F006 suffered less discharge during the storage test, retaining 78% of its charge as compared to 68% for cell F005. It is believed that this reduced spontaneous discharge is related to the lower pressure during storage within the cell precharged in accordance with the present invention.

TABLE III

| Test | Cell No. F005 | Cell No. F006 |
| --- | --- | --- |
| Initial capacity, ampere hours | 39.7 | 53.2 |
| Charge after standing 72 hours, ampere hours | 27.2 | 42 |
| Ratio, standing to initial, percent | 68 | 78 |

Other techniques for achieving the negativeelectrode limited discharge state gas precharge may also be utilized. In one such an alternative approach, the cell is manufactured in accordance with the usual procedures. In the precharging procedure, the fill tube 35 is left open during precharging so that the hydrogen pressure within the cell is essentially atmospheric or 15 psia during charging. An electrical charge that is equivalent to an increase in gas pressure is then passed into the cell to charge the cell, but because the fill tube 35 remains open, the hydrogen partial pressure within the cell does not substantially increase. After the cell is partially charged, the fill tube 35 is sealed and the precharging is complete. This precharge procedure produces substantially the same result as the previously described precharging procedure wherein the pressure is reduced to 15 psia.

As has now been demonstrated, the precharging procedure of the present invention allows a pressurized nickel-hydrogen cell to be precharged in a manner such that the cell may be stored for extended periods of time in the open-circuit condition, without loss of the maximum energy storage capacity after such extended periods. The procedure is fully compatible with the existing design of such cells, and may be readily implemented. Such a precharge cell also suffers less spontaneous discharging during storage in the charged state, as may occur when the cell is placed into operation on board a spacecraft.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for reducing the capacity loss during storage of a pressurized nickel-hydrogen cell comprising:
   precharging the cell prior to storage so that discharge of the cell is negative electrode limited, whereby an electrical charge remains on the nickel positive electrode when the hydrogen partial pressure falls to about 0 psia.

2. The process of claim 1, wherein said step of precharging includes the steps of
   applying a charge to the positive electrode of the cell with the cell unvented, to an electrical charge corresponding to a first pressure; and
   reducing the pressure within the cell to a second pressure.

3. The process of claim 2, wherein the second pressure is about 15 psia.

4. The process of claim 2, wherein the first pressure is about 65 psia.

5. The process of claim 1, wherein said step of precharging includes the step of:
   applying a charge to the positive electrode of the cell while the pressure within the cell is maintained at about 15 psia.

6. The process of claim 5, wherein the charge level corresponds to a hydrogen partial pressure of about 65 psia.

7. A process for precharging a pressurized nickel-hydrogen cell, comprising the steps of:
   discharging the cell to about zero volts at a hydrogen partial pressure of about 15 psia;
   electrically charging the cell while sealed to a charge corresponding to a first hydrogen pressure; and
   reducing the hydrogen pressure to about 15 psia.

8. The process of claim 7, wherein the first gas pressure is about 65 psia.

9. A process for precharging a pressurized nickel-hydrogen cell, comprising:
   passing a current through the cell while the cell is unsealed and maintained at a gas pressure of about 15 psia, until the cell reaches a charge state corresponding to a first sealed hydrogen partial pressure.

10. The process of claim 9, wherein the first sealed hydrogen partial pressure is about 65 psia.

\* \* \* \* \*